(12) United States Patent
Bortun et al.

(10) Patent No.: US 11,635,009 B2
(45) Date of Patent: Apr. 25, 2023

(54) METHOD OF MAKING MESOPOROUS OXYGEN STORAGE MATERIALS FOR EXHAUST GAS TREATMENT; SAID OXYGEN STORAGE MATERIALS AND THEIR USE

(71) Applicant: Pacific Industrial Development Corporation, Ann Arbor, MI (US)

(72) Inventors: Anatoly Bortun, Ypsilanti, MI (US); Mila Bortun, Ypsilanti, MI (US); David Shepard, South Lyon, MI (US); Yunkui Li, Ann Arbor, MI (US); Jin Cho, Utsunomiya (JP); Wei Wu, Ann Arbor, MI (US); Jeffery Lachapelle, Northville, MI (US)

(73) Assignee: Pacific Industrial Development Corporation, Ann Arbor, MI (US)

( * ) Notice: Subject to any disclaimer, the term of this patent is extended or adjusted under 35 U.S.C. 154(b) by 110 days.

(21) Appl. No.: 16/959,465

(22) PCT Filed: Jan. 7, 2019

(86) PCT No.: PCT/US2019/012480
§ 371 (c)(1),
(2) Date: Jul. 1, 2020

(87) PCT Pub. No.: WO2019/136343
PCT Pub. Date: Jul. 11, 2019

(65) Prior Publication Data
US 2021/0071558 A1    Mar. 11, 2021

Related U.S. Application Data

(60) Provisional application No. 62/614,600, filed on Jan. 8, 2018.

(51) Int. Cl.
*B01J 23/00* (2006.01)
*F01N 3/10* (2006.01)
(Continued)

(52) U.S. Cl.
CPC .......... *F01N 3/101* (2013.01); *B01J 23/002* (2013.01); *B01J 23/04* (2013.01); *B01J 35/002* (2013.01);
(Continued)

(58) Field of Classification Search
None
See application file for complete search history.

(56) References Cited

U.S. PATENT DOCUMENTS

| 6,139,814 A | 10/2000 | Nazipovich et al. |
| 6,171,572 B1 | 1/2001 | Aozasa |

(Continued)

FOREIGN PATENT DOCUMENTS

| CN | 1546228 A | 11/2004 |
| CN | 107282032 A | 10/2017 |

(Continued)

OTHER PUBLICATIONS

ATI, Safety Data Sheet of zirconium oxychloride solution, https://www.atimetals.com/safety-data-sheets/Documents/NorthAmerica/NA-EN/SAC/SAC040%20Zirconium%20Oxychloride%20Solution%20NA-EN%20Rev1.pdf (Year: 2019).*

(Continued)

*Primary Examiner* — Melissa S Swain
*Assistant Examiner* — Keling Zhang
(74) *Attorney, Agent, or Firm* — Dickinson Wright PLLC

(57) ABSTRACT

A method of making an oxygen storage material (OSM) with developed mesoporosity having a small fraction of pores <10 nm (fresh or aged), and resistance to thermal sintering is provided. This OSM is suitable for use as a catalyst and (Continued)

catalyst support. The method of making this oxygen storage material (OSM) includes the preparation of a solution containing pre-polymerized zirconium oligomers, cerium, rare earth and transition metal salts; the interaction of this solution with a complexing agent that has an affinity towards zirconium; the formation of a zirconium-based precursor; and the co-precipitation of all constituent metal hydroxide with abase.

6 Claims, 4 Drawing Sheets

(51) Int. Cl.
*B01J 23/04* (2006.01)
*B01J 35/00* (2006.01)
*B01J 35/10* (2006.01)
*B01J 37/03* (2006.01)
*B01J 37/08* (2006.01)

(52) U.S. Cl.
CPC ....... *B01J 35/1038* (2013.01); *B01J 35/1042* (2013.01); *B01J 35/1061* (2013.01); *B01J 37/038* (2013.01); *B01J 37/088* (2013.01)

(56) References Cited

U.S. PATENT DOCUMENTS

| | | | |
|---|---|---|---|
| 6,214,306 B1 | 4/2001 | Aubert et al. | |
| 6,255,242 B1 | 7/2001 | Umemoto et al. | |
| 6,387,338 B1 | 5/2002 | Anatoly et al. | |
| 7,642,210 B2 | 1/2010 | Okamoto | |
| 7,795,171 B2 | 9/2010 | Maruki et al. | |
| 7,919,429 B2 | 4/2011 | Okamoto et al. | |
| 7,927,699 B2 | 4/2011 | Okamoto | |
| 8,956,994 B2 | 2/2015 | Ifrah et al. | |
| 2013/0142713 A1 | 6/2013 | Ifrah et al. | |
| 2016/0121301 A1 | 5/2016 | Shingai | |
| 2016/0207027 A1 | 7/2016 | Kodama | |
| 2016/0296910 A1 | 10/2016 | Wu et al. | |

FOREIGN PATENT DOCUMENTS

| | | |
|---|---|---|
| CN | 107511179 A | 12/2017 |
| EP | 2076326 A2 | 7/2009 |
| EP | 3085667 A1 | 10/2016 |
| JP | H05155622 A | 6/1993 |
| JP | H05193948 A | 8/1993 |
| JP | 2006247635 A | 9/2006 |
| WO | 03084870 A2 | 10/2003 |
| WO | 2017072509 A1 | 5/2017 |
| WO | 2017185224 A1 | 11/2017 |

OTHER PUBLICATIONS

Adamski et al., Synthesis of nanostructured tetragonal ZrO2 of enhanced thermal stability, Nukleonika, 2006 (Year: 2006).*
European Patent Office, Rijswijk, Netherlands, International Search Report of International Application No. PCT/US2019/012480, dated Mar. 27, 2019, 4 pages.

* cited by examiner

METHOD OF MAKING MESOPOROUS OXYGEN STORAGE MATERIALS FOR EXHAUST GAS TREATMENT; SAID OXYGEN STORAGE MATERIALS AND THEIR USE

CROSS REFERENCE TO RELATED APPLICATIONS

This application is a national stage filing of International Application No. PCT/US2019/012480 filed on Jan. 7, 2019, designating the United States and published in English, which claims the benefit of the filing date under 35 U.S.C. § 119(e) of U.S. Provisional Application No. 62/614,600 filed on Jan. 8, 2018, the entire contents of which are both incorporated herein by reference in their entirety.

FIELD

This disclosure relates generally to an oxygen storage material, method of making said storage material and use thereof. More specifically, the oxygen storage material may be used in catalytic applications.

BACKGROUND

The statements in this section merely provide background information related to the present disclosure and may not constitute prior art.

Cerium-zirconium mixed oxides are widely used as oxygen storage materials (OSM) in three-way catalysts for treatment of vehicles exhaust gases. There are several requirements that OSM should meet for successful application. These requirements include high thermal stability, resistance to sintering, and compatibility with precious metals, thereby, enabling the high dispersion of these metals on the surface of the OSM.

Different methods are used to make conventional ceria-zirconia based OSM. These methods include sol-gel techniques as described in JP-A-5-193948, solid-state reactions between reagents as shown in JP-A-5-155622, and impregnation as defined within U.S. Pat. No. 6,139,814. The most common and widely used processes for making thermally stable OSM are precipitation/co-precipitation based on U.S. Pat. Nos. 6,171,572; 6,214,306; 6,255,242; 6,387,338; 7,431,910; and 7,919,429; 7,927,699, as well as U.S. Publication No. 2016/0207027. The OSM made by a precipitation/co-precipitation technique have high resistance for sintering and, in some cases, their surface area after ageing at 1100° C. could exceed 15-25 m$^2$/g.

Porosity of OSM material is another important factor that has a significant effect on the application thereof. OSM with large pores (i.e., meso-pores and macro-pores) have advantages of better diffusion of gases, as well as enhanced thermal stability. Mixed oxides with average pore diameter between 7 nanometers (nm) and 10 nm are easily sinterable as shown in U.S. Pat. No. 7,642,210, whereas materials with larger pores (i.e., meso- and macro-pores) are much more thermally resistant as described in U.S. Pat. Nos. 7,642,210; 7,795,171; 7,927,699; and 8,956,994. Another disadvantage of OSM with small pores (i.e., micro-pores and mesopores that are less than 10 nm) is encapsulation and deactivation of a significant fraction of the platinum group metal (PGM) loaded on the surface of the OSM after ageing. From this aspect OSM without or with small fraction of pores with diameter less than 10 nm would be preferential for PGM thrifting. Thus, an oxygen storage material (OSM) that meets the requirements for a three way catalyst (TWC) requirements with developed mesoporosity having a lack of small pores and resistance to sintering is desirable.

SUMMARY

The present disclosure generally provides a method of making an oxygen storage material (OSM) with developed mesoporosity having a small fraction of pores <10 nm (fresh or aged), and resistance to thermal sintering. This OSM is suitable for use as a catalyst and catalyst support. The process of making this oxygen storage material (OSM) generally comprises: the preparation of a solution containing pre-polymerized zirconium oligomers, cerium, rare earth and transition metal salts; the interaction of this solution with a complexing reagent that has an affinity towards zirconium; the formation of a zirconium-based precursor; and the co-precipitation of all constituent metal hydroxide with a base.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
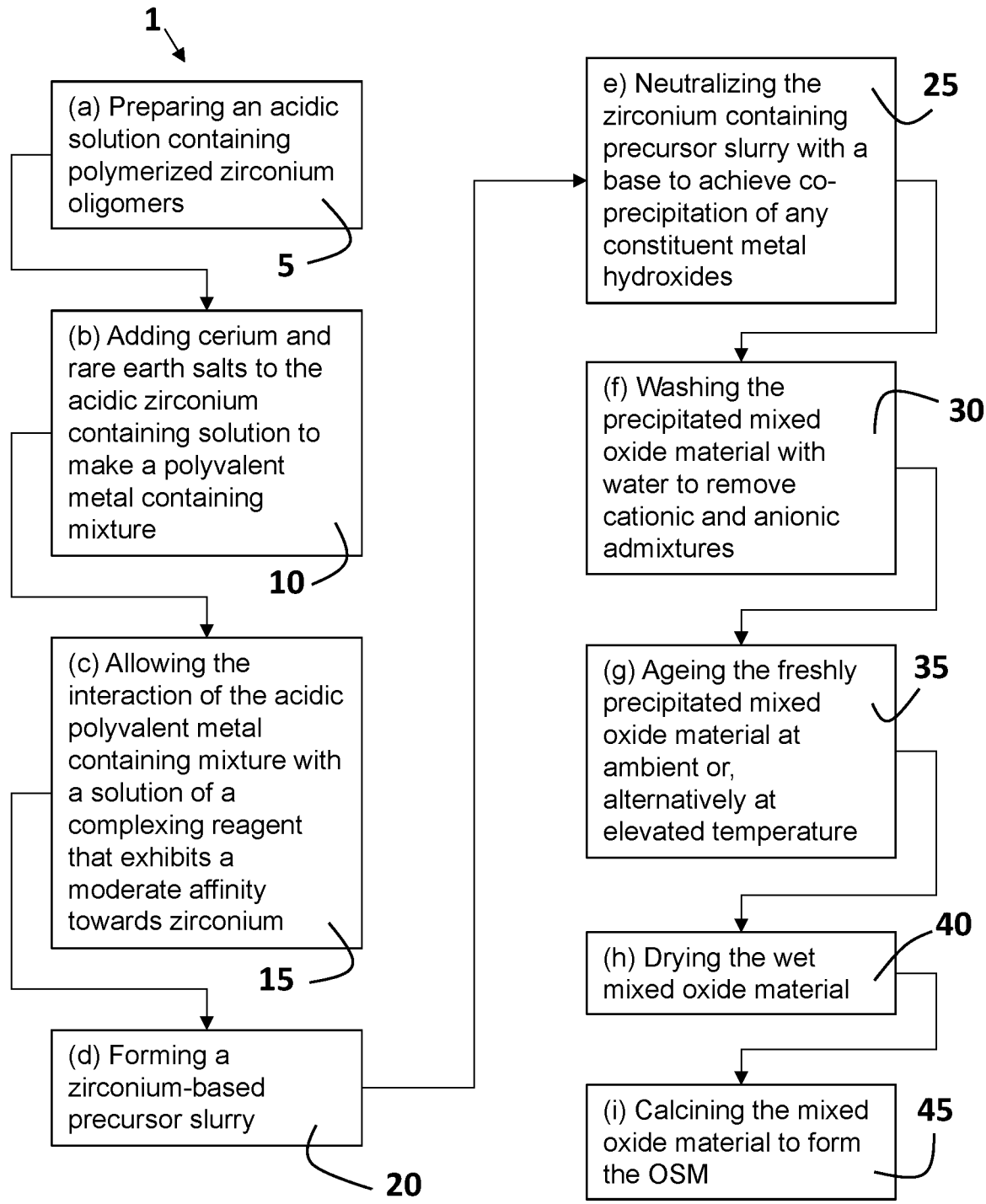
FIG. 1 is a schematic representation of a flowchart that illustrates a method of forming an oxygen storage material (OSM) according to the teachings of the present disclosure.

The drawings described herein are for illustration purposes only and are not intended to limit the scope of the present disclosure in any way.

DETAILED DESCRIPTION

The following description is merely exemplary in nature and is in no way intended to limit the present disclosure or its application or uses. For example, the oxygen storage material (OSM) made and used according to the teachings contained herein is described throughout the present disclosure in conjunction with three-way catalysts for treatment of vehicles exhaust gases in order to more fully illustrate the composition and the use thereof. The incorporation and use of such an oxygen storage material in other catalysts, such as, four-way catalysts, diesel oxidation catalysts, and oxidation catalysts, or catalytic applications are contemplated to be within the scope of the present disclosure. It should be understood that throughout the description, corresponding reference numerals indicate like or corresponding parts and features.

The present disclosure generally provides an oxygen storage material (OSM) and method of making such OSM having a developed mesoporosity, a small fraction of pores with diameter less than 10 nm, and an enhanced resistance to sintering. The mesoporous OSM has a fraction of pores with a diameter between about 2 nm and 10 nm that is less than 20%; alternatively, less than 15%; alternatively, less than 10%.

Referring to FIG. 1, the method 1 of making the mesoporous OSM generally comprises the steps (a)-(i). Step (a) involves preparing 5 an acidic solution containing polymerized zirconium oligomers. Step (b) adds 10 an acidic solution of cerium and rare earth salts to the zirconium containing solution to make a polyvalent metal containing mixture. Step (c) allows 15 for the interaction of the acidic polyvalent metal containing mixture with a solution of a complexing reagent that exhibits an affinity towards zirconium. In step (d) a zirconium-based precursor slurry is formed 20. Step (e) neutralizes 25 the zirconium containing precursor slurry with a base to achieve co-precipitation of any constituent metal hydroxides. Step (f) washes 30 the precipitated mixed oxide material with water to remove cationic and anionic admixtures. Step (g) ages 35 the freshly precipitated mixed oxide material at ambient or, alternatively at an elevated temperature. Step (h) dries 40 the wet mixed oxide material. Finally, step (i) calcines 45 the mixed oxide material to form the OSM.

Referring to specific aspects of the method 1, the acidic solution that is prepared 5 comprises a solution containing polymerized zirconium oligomers in an amount ranging from about 30% to about 100% by weight of the total weight of the solution. Alternatively, the polymerized zirconium oligomers are present in an amount ranging from 35 wt. % to about 90 wt. %; alternatively, 40 wt. % to about 80 wt. %; alternatively, greater than 30% by weight; alternatively, greater than 50% by weight; alternatively, greater than 75% by weight.

The polymerized zirconium oligomer solution may be prepared 5 by any known method. These methods may include, without limitation, partial removal of any charge balancing counter-anion by electrodialysis; anionic extraction with aliphatic amines or by the treatment with an anion exchange resin; dissolution of freshly made zirconium hydroxide in an acid; or using a red-ox reaction with a chloride ion form a zirconium oxychloride solution and $H_2O_2$ in acidic media. The use of polymerized zirconium species as a zirconium source results in changing starting blocks in zirconia nuclei formation from zirconium tetramer units in the case of zirconium oxychloride to zirconium oligomer species (e.g., octamers) to a different extent, which increases average nuclei size and alters their morphology. When desirable, the polymerized zirconium oligomers may comprise zirconium octamers in an amount ranging from about 30 to 100%; alternatively, in an amount ranging from about 40% to about 90%. The polymerized zirconium oligomers do not contain zirconia sol particles.

Another aspect of the method 1 is adding 15 a complexing agent to the polyvalent metal reaction mixture. The complexing agent may comprise anions that have an affinity towards zirconium. The complexing agent may be selected from the group comprising, consisting of, or consisting essentially of a sulfate, an oxalate, a succinate, a fumarate, and combinations thereof. When the amount of zirconium complexing agent (ZCA) is chosen such that it has a molar ratio of ZCA/ZrO2 between about 0.35 and about 0.85, the complexing agent is adsorbed onto the surface of the zirconium oligomers, thereby, occupying and protecting reactive sites from participation in further polymerization reactions. Alternatively, the ZCA/ZrO2 ratio is between 0.40 and 0.80; alternatively, between 0.50 and 0.70. As a result, during the neutralization reaction (e.g., addition of a base) the complexing agent slows down the formation of zirconium hydroxide primary particles due to the competition arising from hydroxyl ions and the effects on their size, morphology, and way of packing (e.g., enabling formation of loosely assembled secondary aggregates). Further precipitate drying and calcination stabilizes open framework architecture of the mixed oxide material, which yields materials exhibiting developed mesoporosity, lack of small pore (<10 nm), and improved thermal stability.

According to yet another aspect of the method the polyvalent metal-containing mixture comprises, without limitation, water soluble nitrates, chlorides, sulfates, citrates, acetate salts, or a combination thereof. A base used for precipitation may be chosen from alkali hydroxides, hydrous ammonia, or tetraalkylammonium hydroxide.

The Oxygen Storage Material of the invention is characterized also by a specific composition that comprises, consists of, or consists essentially of zirconium, cerium, and at least one rare earth metal other than cerium. The zirconium oxide in the oxygen storage material is not less than 20% by weight and, alternatively, not less than 40% by weight. The cerium oxide content in the OSM of the present disclosure is present in an amount from about 5 wt. % to about 70 wt. %. Alternatively, the cerium oxide content in the OSM is between about 10 wt. % and about 60 wt. %; alternatively, between about 20 wt. % to about 50 wt. %.

According to another aspect of the present disclosure, the OSM comprises one or more rare earth metals other than cerium. These rare earth metals may include, but not be limited to, lanthanum, neodymium, praseodymium, yttrium, or combination of thereof. The rare earth metals may be present in amount ranging from 0% up to 15% by weight based on the overall weight of the OSM. Alternatively, the rare earth metals are present in an amount that is greater than 0% and less than 15% by weight; alternatively, between about 5% and 10% by weight relative to the overall weight of the OSM.

According to another aspect of the present disclosure, the total pore volume (PV) of the OSM after calcination at 600° C. is at least 0.5 cm$^3$/g with the fraction of pores that are less than 10 nm in diameter being less than 20%. The total pore volume of the OSM after calcination at 800° C. is at least 0.3 cm$^3$/g with the fraction of pores that are less than 10 nm in diameter being less than 10%. The fresh OSM exhibits a single modal pore size distribution having an average pore radius in the range from about 15 nm to about 35 nm; alternatively, 20 nm to 30 nm.

The fraction of pores in the OSM that are less than 10 nm in diameter is less than 5% after ageing at 1000° C. or higher. The aged OSM exhibits a single modal pore size distribution with an average pore radius in the range from about 20 nm to about 40 nm; alternatively, from 25 nm to 35 nm. According to another aspect of the present disclosure the average pore diameter of the OSM remains basically unchanged in a broad calcination temperature range from about 600° C. up to about 1100° C.

For the purpose of this disclosure the terms "about" and "substantially" are used herein with respect to measurable values and ranges due to expected variations known to those skilled in the art (e.g., limitations and variability in measurements).

For the purpose of this disclosure, the term "weight" refers to a mass value, such as having the units of grams, kilograms, and the like. Further, the recitations of numerical ranges by endpoints include the endpoints and all numbers within that numerical range. For example, a concentration ranging from 40% by weight to 60% by weight includes concentrations of 40% by weight, 60% by weight, and all concentrations there between (e.g., 40.1%, 41%, 45%, 50%, 52.5%, 55%, 59%, etc.).

For the purpose of this disclosure, the terms "at least one" and "one or more of" an element are used interchangeably and may have the same meaning. These terms, which refer to the inclusion of a single element or a plurality of the elements, may also be represented by the suffix "(s)" at the end of the element. For example, "at least one polyurethane", "one or more polyurethanes", and "polyurethane(s)" may be used interchangeably and are intended to have the same meaning.

The following specific examples are given to illustrate the oxygen storage material formed according to the teachings of the present disclosure and should not be construed to limit the scope of the disclosure. Those skilled-in-the-art, in light of the present disclosure, will appreciate that many changes can be made in the specific embodiments which are disclosed herein and still obtain alike or similar result without departing from or exceeding the spirit or scope of the disclosure. One skilled in the art will further understand that any properties reported herein represent properties that are routinely measured and can be obtained by multiple different methods. The methods described herein represent one such method and other methods may be utilized without exceeding the scope of the present disclosure.

Example 1A—Preparation of OSM

A total of 97.0 g of $ZrOCl_2*8H_2O$ crystals are dissolved in 200 g of DI water. Then 35.8 g of a 27.9 wt. % cerium (III) nitrate solution, 9.8 g of a 25.4 wt. % praseodymium nitrate solution, and 9.9 g of 25.3 wt. % lanthanum nitrate solution are added to the zirconium containing solution. The polyvalent metal containing mixture is passed through a column with 300 g of DOW Amberlite PWA15 resin in OH-form to form pre-polymerized zirconium oligomers. Then, a total of 90 g of 20 wt. % $Na_2SO_4$ solution is added to the polyvalent metal mixture followed by the slow addition of a 20 wt. % NaOH solution until the pH of the reaction mixture reaches 13. The precipitate that forms is filtered using a Buchner filter and washed with deionized water to remove excess of chloride, nitrate, sulfate and sodium ions.

Figure 2:
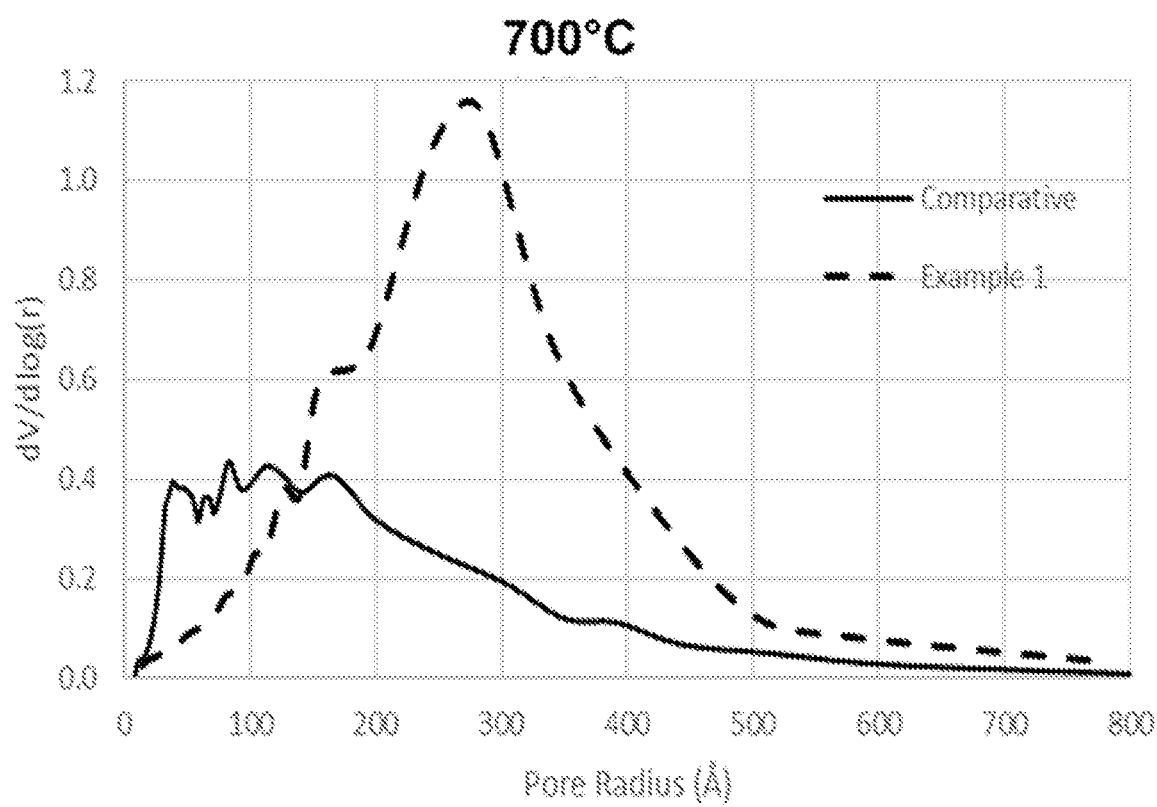
FIG. 2 is a graphical representation of the pore size distribution exhibited by fresh samples of the OSM material made in Example 1 (dashed line) and Comparative Example 1A (solid line)
Figure 3:
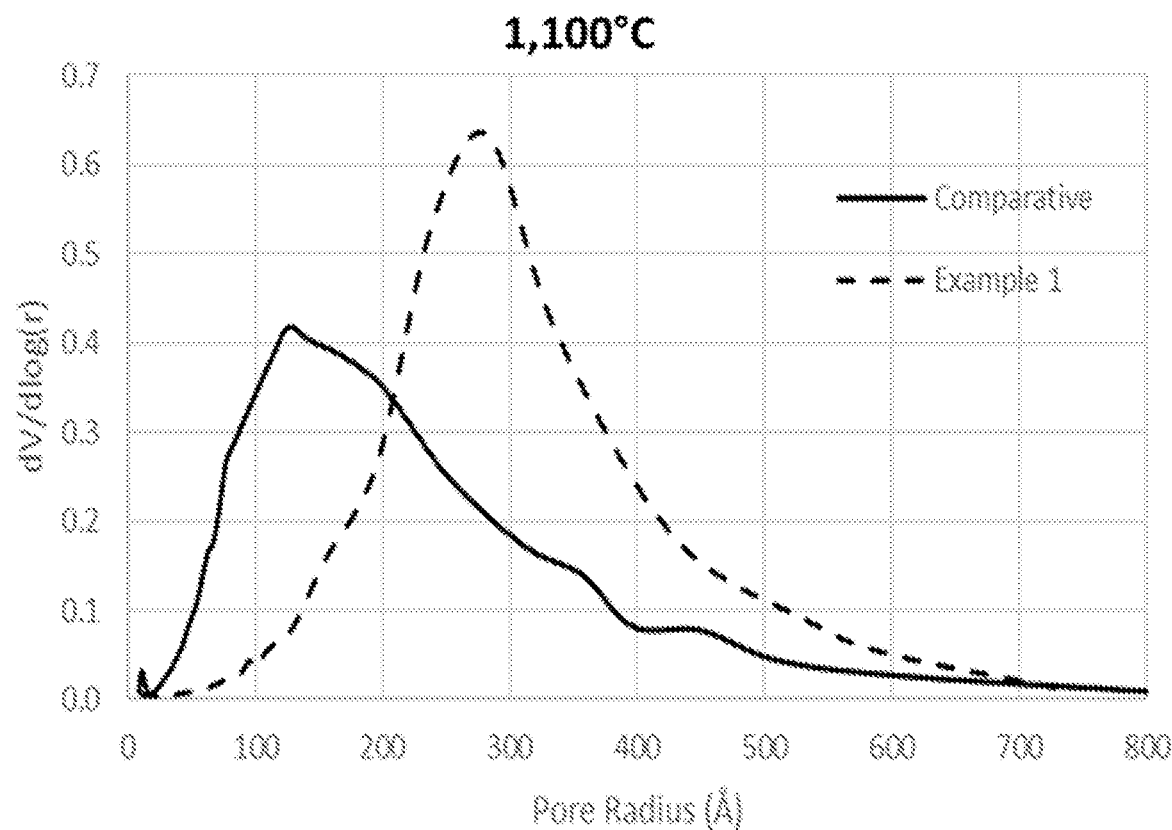
FIG. 3 is a graphical representation of the pore size distribution exhibited by samples made in Example 1 (dashed line) and Comparative Example 1A (solid line) after ageing at 1100° C. for two (2) hours.

The wet collected precipitate is dried in an electric oven at 130° C. for about 12 hours and then calcined in air at 700° C. for 2 hours. The calcined OSM is then additionally aged at 1100° C. for 2 hours. The pore radius for the OSM material is measured both after calcination at 700° C. (see FIG. 2) and after ageing at 1,100° C. (see FIG. 3).

Example 1C—Preparation of Comparative OSM

A total of 97.0 g of $ZrOCl_2*8H_2O$ crystals are dissolved in 200 g of deionized (DI) water. Then 35.8 g of a 27.9 wt. % cerium (III) nitrate solution, 9.8 g of a 25.4 wt. % praseodymium nitrate solution, and 9.9 g of a 25.3 wt. % lanthanum nitrate solution are added to the zirconium containing solution. Then 90 g of a 20 wt. % $Na_2SO_4$ solution is added to the polyvalent metal mixture followed by the slow addition of a 20 wt. % NaOH solution until pH of the reaction mixture reaches 13. The formed precipitate is filtered using a Buchner filter and washed with deionized water to remove excess of chloride, nitrate, sulfate and sodium ions.

The wet collected precipitate is dried in electric oven at 130° C. for about 12 hours and then calcined at 700° C. for 2 hours in air. The calcined sample is additionally aged at 1100° C. for 2 hours. Surface area and pore size distribution for the OSM material is measured both after calcination at 700° C. (see FIG. 2) and after ageing at 1,100° C. (see FIG. 3) by conventional Brunauer-Emmett-Teller (BET) and Barrett-Joyner-Halenda (BHJ) analysis methods using a TriStar Micromeritics Inc. analyzer.

Example 2—Preparation of OSM

Preparation of a pre-polymerized zirconium containing solution comprises mixing 100 g of a slurry that contains 30.3 g of a zirconium basic carbonate (41.3 wt. % ZrO2) with 53.4 g of a 23.4 wt. % $ZrOCl_2$ solution until the resulting solution is clear. Then 63 g of a 27.8 wt. % cerium (III) nitrate solution, 13.5 g of a 29.65 wt. % neodymium nitrate solution, 5.45 g of a 18.3 wt. % lanthanum nitrate solution, and 12.95 g of a 19.3 wt. % yttrium nitrate solution are added to the zirconium containing solution. Then, 71.6 g of a 20 wt. % $Na_2SO_4$ solution is added to the polyvalent metal mixture, followed by the slow addition of a 20 wt. % NaOH solution until the pH of the reaction mixture reaches 13. The formed precipitate is filtered using a Buchner filter and washed with deionized water to remove excess of chloride, nitrate, sulfate and sodium ions.

The wet collected precipitate is dried in an electric oven at 130° C. for 12 hours and then calcined in air at 600° C. for 2 hours. Calcined sample is then additionally aged at 1000° C. to 1100° C. for 2 hours.

Example 3—Preparation of OSM

A solution containing Zr, Ce, Nd, La and Y salts is prepared by mixing 63.5 g of $ZrOCl_2*8H_2O$, 62.7 g of a 27.9 wt. % cerium (III) nitrate solution, 13.5 g of a 29.65 wt. % neodymium nitrate solution, 5.45 g of a 18.3 wt. % lanthanum nitrate solution, and 12.95 g of a 19.3 wt. % yttrium nitrate solution with 1000 g of deionized (DI) water. Then, 65 g of a 10 wt. % NaOH solution is added to polyvalent metal containing solution and mixed until a clear solution is formed. A total of 64 g of a 20 wt. % $Na_2SO_4$ solution is then added to the solution containing the polymerized zirconium oligomers followed by the slow addition of a 20 wt. % NaOH solution until the pH of the reaction mixture reaches 13. The formed precipitate is filtered using a Buchner filter and washed with deionized water to remove excess of chloride, nitrate, sulfate and sodium ions.

The wet collected precipitate is first dried in an electric oven at 130° C. for 12 hours and then calcined in air at 800° C. for 2 hours. The calcined sample is additionally aged at 1100° C. for 2 hours.

Example 4—Property Measurement for OSM

The surface area (SA) and pore volume (PV) of the OSM prepared in Examples 1A, 10, 2, and 3 are measured after calcination at 700 C and after aging at 1,100 C. The surface area of the OSM is measured using conventional BET analysis method on a Micromeritics Tristar II analyzer. The pore volume of the OSM is measured using conventional BJH analysis method on a Micromeritics Tristar II analyzer. The results of the measurements are summarized in Table 1.

TABLE 1

| | Composition | SA | PV | PV (<10 nm) | SA-1100/2 | PV-1100/2 | PV-1100/2 (<10 nm) |
|---|---|---|---|---|---|---|---|
| Example 1A | 70Ce—20Ce—5La—5Pr | 87.8 | 0.71 | 0.06 | 29 | 0.24 | 0.01 |
| Comparative Example 1C | 70Ce—20Ce—5La—5Pr | 82.1 | 0.43 | 0.19 | 18.5 | 0.16 | 0.04 |
| Example 2 | 50Zr—35Ce—8Nd—5Y—2La | 98.7 | 0.77 | 0.13 | 26.5 | 0.22 | 0.01 |
| Example 3 | 50Zr—35Ce—8Nd—5Y—2La | 88.5 | 0.73 | 0.08 | 27 | 0.24 | 0.01 |

This Example demonstrates that the surface area and pore volume of the OSM prepared according to the teachings of the present disclosure (Examples 1A, 2, and 3) is greater than the surface area and pore volume of the comparative example 10 both after initial calcination, as well as ageing at an elevated temperature. However, even despite the fact that pore volume (PV) of fresh and aged OSM of the present disclosure (Examples 1A, 2, & 3) is much higher than that of the reference OSM (Example 10), the volume of small pores with diameter less than 10 nm is significantly lower than that of the reference material (Example 10). The fraction of the volume of small pores (<10 nm) for fresh and aged OSM of the invention is 8-17% and 4-5% respectively, in comparison with 44% and 25% for the reference OSM (Example 10).

Figure 4:
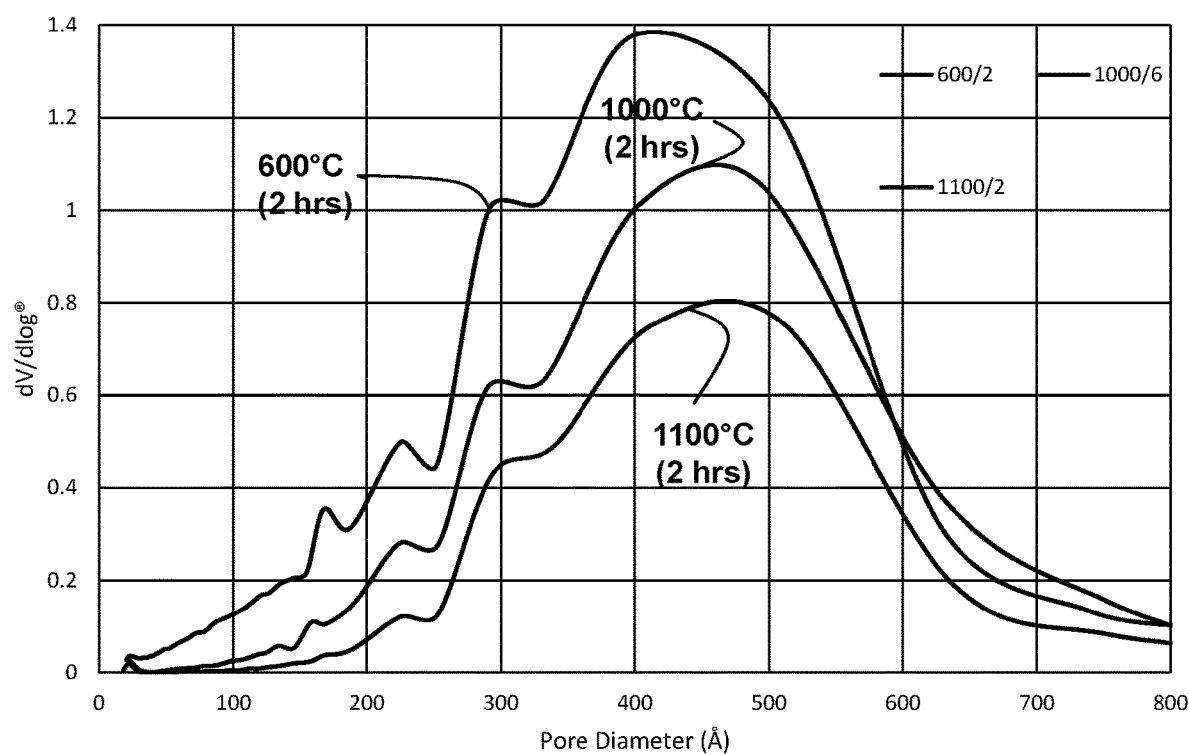
FIG. 4 is a graphical representation of the pore size distribution exhibited by fresh and aged samples prepared according to Example 2.

The pore size distribution measured for the fresh and aged OSM prepared according to Example 2 is provided in FIG. 4. As shown in FIG. 4, the average pore size of the OSM is about 40-45 nm and remains unchanged over a broad calcination temperature range from 600° C. up to 1100° C. The only observable change is a gradual decrease of the total pore volume. This is an unexpected result of the present disclosure because the typical result is an increase in average pore size diameter coinciding with an increase in calcination temperature due to the gradual collapse of small pores.

Within this specification, embodiments have been described in a way which enables a clear and concise specification to be written, but it is intended and will be appreciated that embodiments may be variously combined or separated without parting from the invention. For example, it will be appreciated that all preferred features described herein are applicable to all aspects of the invention described herein.

The foregoing description of various forms of the invention has been presented for purposes of illustration and description. It is not intended to be exhaustive or to limit the invention to the precise forms disclosed. Numerous modifications or variations are possible in light of the above teachings. The forms discussed were chosen and described to provide the best illustration of the principles of the invention and its practical application to thereby enable one of ordinary skill in the art to utilize the invention in various forms and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. A method for making a mesoporous Oxygen Storage Material (OSM), the method comprising steps of:
   (a) preparing an acidic pre-polymerized solution containing polymerized zirconium oligomers, the the polymerized zirconium oligomers comprising zirconium octamers in an amount ranging from about 30 to 100% by weight based on the polymerized zirconium oligomers;
   (b) adding an acidic solution of cerium and at least one rare earth other than cerium salts to the acidic pre-polymerized solution of zirconium oligomer species to make a polyvalent metal containing mixture;
   (c) adding a complexing agent to the polyvalent metal containing mixture;
   (d) allowing for interaction of the polyvalent metal containing mixture with the complexing reagent comprising anions that have an affinity towards zirconium;
   (e) forming a zirconium-based precursor slurry;
   (f) neutralizing the zirconium-based precursor slurry with a base to achieve co-precipitation of any constituent metal hydroxides;
   (g) washing the co-precipitated metal hydroxides with water to remove cationic and anionic admixtures;
   (h) drying the washed co-precipitated metal hydroxides; and
   (i) calcining the washed co-precipitated metal hydroxides to form the mesoporous OSM;
   wherein the mesoporous OSM has a fraction of 2-10 nm pores that is less than 20% by volume.

2. The method for making the mesoporous OSM according to claim 1, wherein the polymerized zirconium oligomers do not contain zirconia sol particles.

3. The method for making the mesoporous OSM according to claim 1, wherein the complexing agent is selected from the group consisting of a sulfate, an oxalate, a succinate, a fumarate and combinations thereof.

4. The method for making the mesoporous OSM according to claim 1, wherein the complexing reagent and zirconium are present such that a molar ratio of the complexing agent to zirconium is in a range of about 0.35 to about 0.85.

5. The method for making the mesoporous OSM according to claim 1, wherein the polyvalent metal containing mixture comprises water soluble nitrates, chlorides, sulfates, citrates, acetate salts, or a combination thereof.

6. The method for making the mesoporous OSM according to claim 1, wherein the base is selected from the group of alkali metal hydroxides, aqueous ammonia, and tetraalkylammonium hydroxide.

* * * * *